D. KELLEHER & D. C. ASHLEY.
Bake-Pans.
No. 149,867.
Patented April 21, 1874.
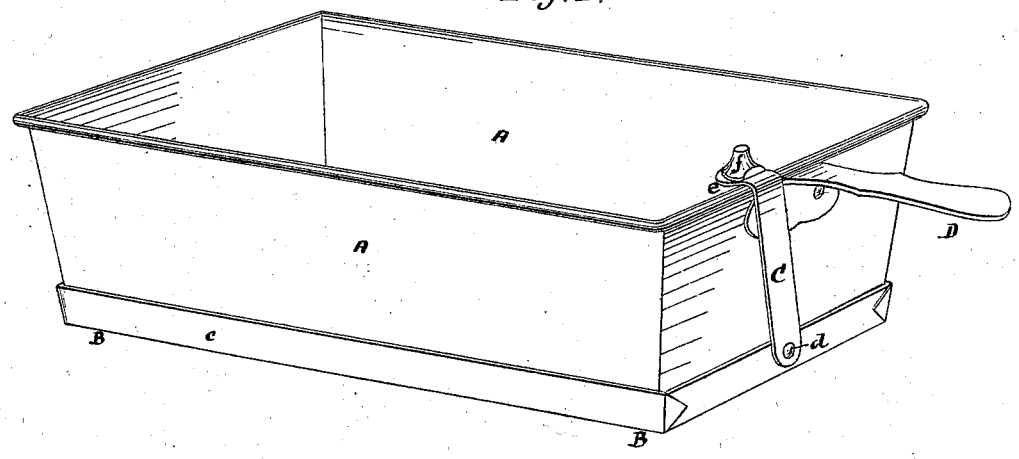
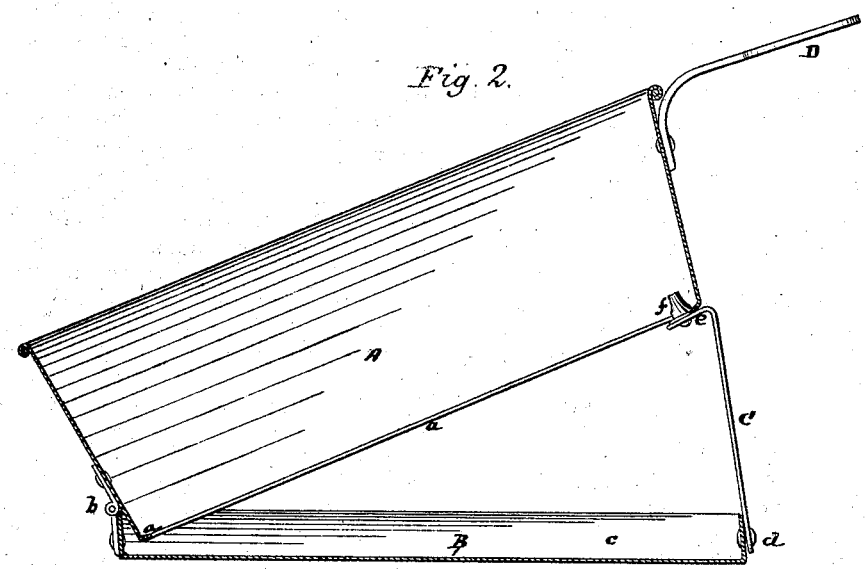
Witnesses.
Inventors.

UNITED STATES PATENT OFFICE.

DANIEL KELLEHER AND DANIEL C. ASHLEY, OF NEW BEDFORD, MASS.

IMPROVEMENT IN BAKE-PANS.

Specification forming part of Letters Patent No. 149,867, dated April 21, 1874; application filed March 23, 1874.

*To all whom it may concern:*

Be it known that we, DANIEL KELLEHER and DANIEL C. ASHLEY, of New Bedford, in the State of Massachusetts, have invented certain new and useful Improvements in Bake-Pans, of which the following is a specification:

Our invention, which relates to pans for baking bread, cake, pies, and like articles, is intended to afford a ready means whereby the bottom or under side of the loaf of bread, or other article contained in the pan, can be examined without taking it therefrom, and whereby said under side can, at the proper time, be exposed to the direct action and contact of the heat.

We accomplish these results by furnishing the pan with a hinged bottom, which permits the body of the pan to be raised therefrom for either of the objects above named, the body being maintained in its tilted or elevated position, with relation to the bottom, (when it is desired to expose the under side of the bread or other article to the heat,) by means of a prop, preferably combined with and forming part of the pan, and serving, also, as a means whereby, when the body is lowered onto the bottom, the two can be locked together.

The nature of our invention, and the manner in which the same is or may be carried into effect, can best be explained and understood by reference to the accompanying drawing, in which—

Figure 1 is a perspective view of our improved bake-pan. Fig. 2 is a longitudinal vertical section of the same, with the body tilted or raised from the bottom, and held in such position by the prop hereinbefore alluded to.

A is the body of the pan, of any suitable form and size, according to the particular use for which it may be designed. Around its lower edges is an inwardly-projecting horizontal flange, *a*, which may vary in width—say from one-eighth of an inch to one inch—which we prefer to provide both to make a proper joint with the bottom, and also to serve as a means of retaining the bread or other article in place in the body when the latter is raised or tilted, as seen in Fig. 2. Hinged at a suitable point, as at *b*, to the body A is the bottom B, within which the lower portion of the body A is adapted to fit snugly.

If desired, one of the upright flanges *c* of the bottom B can be dispensed with, or cut away to permit a knife to be inserted underneath the bottom of the loaf, so as to separate it from the bottom B, if, by any chance, it should stick or adhere thereto.

To part B is attached a piece, C, preferably of spring metal, and hinged or pivoted, if desired, to B at *d*. This piece C, which at once serves as a prop and a locking device, is provided with a hook, *e*, on its upper end, which, when the body A and bottom B are shut together, will snap over the upper edge of body A, and so hold it down on the hinged bottom. When, on the contrary, the body is lifted, as in Fig. 2, the hook can be sprung under the body, and the lug *f* on the hook *e* be caused to catch against the inside of lower edge of the body A, so as to prevent the prop from disengaging or springing out from under the body.

We prefer to employ the combined prop and lock or catch, substantially such as represented; but it will be readily seen that any suitable means, such as a hook-and-eye fastening, can be employed to hold together the body and bottom of the pan, while a distinct prop-piece, either attached to the pan, or separate therefrom, may be used to hold the pan in its elevated position.

The pan, if desired, can be provided with a suitable handle, D.

What we claim as our invention, and desire to secure by Letters Patent, is—

1. A bake-pan in which the body is combined with a movable bottom hinged thereto, substantially as and for the purposes specified.

2. The combination of the pan-body, the hinged bottom, and the prop and locking device, under the arrangement and for operation substantially as shown and described.

In testimony whereof we have hereunto signed our names this 21st day of March, A. D. 1874.

DANIEL KELLEHER.
DANIEL C. ASHLEY.

Witnesses:
WM. H. TAYLOR,
ELIHU BUNKER.